United States Patent [19]

Printiss, Sr.

[11] Patent Number: 4,953,899
[45] Date of Patent: Sep. 4, 1990

[54] CLAMP ASSEMBLY

[75] Inventor: Frederick H. Printiss, Sr., Neillsville, Wis.

[73] Assignee: Nelson Industries, Inc., Stoughton, Wis.

[21] Appl. No.: 312,921

[22] Filed: Feb. 21, 1989

[51] Int. Cl.[5] .............................................. F16L 19/02
[52] U.S. Cl. ...................................... 285/420; 24/279; 285/424
[58] Field of Search ............... 285/367, 420, 410, 411, 285/424, 382.2; 24/279, 280, 283, 286, 19, 277, 278

[56] References Cited

U.S. PATENT DOCUMENTS

| | | |
|---|---|---|
| 492,855 | 3/1893 | Widaw . |
| 1,052,112 | 2/1913 | Welch . |
| 1,268,934 | 6/1918 | Crabill . |
| 1,468,297 | 9/1923 | Hogg et al. . |
| 2,241,042 | 5/1941 | Scarritt .................................. 24/19 |
| 3,722,041 | 3/1973 | Munse ................................. 24/283 |
| 3,900,933 | 8/1975 | Engman et al. ...................... 24/277 |
| 3,984,134 | 10/1976 | Engman et al. .................... 285/382.2 |
| 4,492,394 | 1/1985 | Schaub ................................ 285/236 |
| 4,640,536 | 2/1987 | Printiss et al. ...................... 285/367 |

FOREIGN PATENT DOCUMENTS

| | | | |
|---|---|---|---|
| 2906728 | 8/1979 | Fed. Rep. of Germany ... | 285/382.2 |
| 1179522 | 5/1959 | France ..................... | 24/283 |
| 6717111 | 12/1967 | Netherlands ............. | 24/277 |
| 0541613 | 12/1941 | United Kingdom ...... | 24/283 |

OTHER PUBLICATIONS

Heco Dyna-Grip-Exhaust System Clamp.
G & H Industries Super Lock Muffler Clamp.
Mercury Clamp Engineering Specifications.
Nelson Muffler Corporation-Band Clamps.
AP Parts Company-Clamps for the Long Haul.
G.E.S. Products Pty. Ltd. "Versatile New Clamp Offers Many Advantages".
Nelson Division-Strap Clamp Chart.
Bryant Clamp Corporation.
Mercury Metal Products-V-Section Clamps.
Mercury Metal Products-Truck Seal Clamp.
Torca Products Inc.-Open Butt Joint Exhaust Sealing Clamp.
Flexonics Division UOP Inc. Interlocked Exhaust Connectors.
Federal Metal Hose Corporation, Exhaust Clamps.
FAF-TECH Company.

*Primary Examiner*—Dave W. Arola
*Assistant Examiner*—Carol I. Bordas
*Attorney, Agent, or Firm*—, Sceales, Starke & Sawall Andrus

[57] ABSTRACT

An improved clamp assembly for clamping the overlapping ends of metal tubes in an exhaust system. The clamp assembly includes a metal ring having a pair of overlapping end portions disposed in side-by-side contact. A generally U-shaped bracket is secured to each of the end portions and each bracket has a pair of opposed legs connected by a web portion. Extensions project longitudinally outward from the end of each leg and the extensions are offset laterally from each other. One leg of each bracket is welded to one of the end portions of the ring and the welded leg is bent adjacent the weld to position the first extension in slidable contact with the other end portion of the ring. The extension of the opposite leg is disposed in side-by-side relation with the first extension and also serves to slidably receive the opposite end portion of the ring. A bolt extends through aligned openings in the brackets and the head of the bolt bears against the side edge of one bracket while a nut threaded on the opposite end of the bolt bears against the side edge of the other bracket. By threading down the bolt, the ring is contracted in diameter to provide a low cost, 360° C. closure for clamping the tubes.

5 Claims, 1 Drawing Sheet

CLAMP ASSEMBLY

BACKGROUND OF THE INVENTION

Tube clamps are used in exhaust systems to clamp the overlapping ends of metal tubes. As used in exhaust systems, a tube clamp should be low in cost and sufficiently strong to deform 16 gauge, unslotted, metal tubes.

The clamp should also provide a full 360° closure to provide a positive gas-tight seal. As a further requirement, the clamp should also be reusable so that it does not have to be discarded when removed. It is also desirable that the clamp be adapted for use with various sized tubes to reduce the tooling cost and inventory of clamps.

U.S. Pat. No. 4,640,536 describes a clamp assembly for clamping unslotted, overlapping ends of metal tubes in an exhaust system. The clamp assembly of the aforementioned patent comprises a metal ring and the ends of the ring are in overlapping contacting relation. One leg of a generally U-shaped bracket is welded to each overlapping end and the opposite end of the bracket is disposed in sliding engagement with the outer surface of the other overlapping end of the ring. A bolt extends through aligned openings in the U-shaped brackets and the head of the bolt bears against the side edge of one bracket, while a nut threaded on the opposite end of the bolt bears against the side edge of the other bracket. By threading down the nut, the brackets are brought together to contract the ring in diameter and provide a positive 360° clamping action for the overlapping ends of the tubes.

SUMMARY OF THE INVENTION

The invention is directed to a clamp assembly having particular use for clamping unslotted overlapping ends of metal tubes in an exhaust system and is an improvement to the clamp assembly as shown in U.S. Pat. No. 4,640,536.

In accordance with the invention, the clamp assembly includes a metal ring having a pair of overlapping end portions which are disposed in side-by-side contact. The clamp assembly also includes a pair of generally U-shaped brackets, each bearing a pair of opposed legs connected by a web.

An extension extends longitudinally outward from the end of one leg, while a second extension extends longitudinally outward from the end of the other leg and is offset laterally from the first extension.

One leg of each bracket is welded to one of the end portions of the ring and the welded leg is bent axially at a location adjacent the weld and then radially and is disposed in sliding engagement with the other end portion of the ring.

The extension associated with the unwelded leg is disposed in side-by-side relation with the first extension, so that the two side-by-side extensions comprise a guide for slidably guiding the other end portion of the ring as the ring is contracted in diameter.

A bolt extends through the aligned openings in the brackets and the head of the bolt bears against the side edge of one bracket, while a nut threaded on the opposite end of the bolt, bears against the side edge of the other bracket. By threading down the nut, the brackets are brought together to contract the ring in diameter and provide a positive clamping action for the overlapping ends of the tubes.

With the construction of the invention, a more positive clamping action is provided which prevents deformation of the brackets, and maintains the overlapping ends of the ring in intimate contact as the ring is contracted in diameter.

The clamp assembly provides a full 360° closure to provide a positive gas-tight seal when used in an exhaust system and thereby prevents leakage of emissions from the joint between the tubes.

The clamp assembly of the invention is also reusable. By removing or cutting the bolt, the clamp can be removed from the tubes and subsequently reused.

The clamp can also be used for a wide variety of different tube diameters. This is a substantial advantage in that it reduces tooling costs and inventory of clamps.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
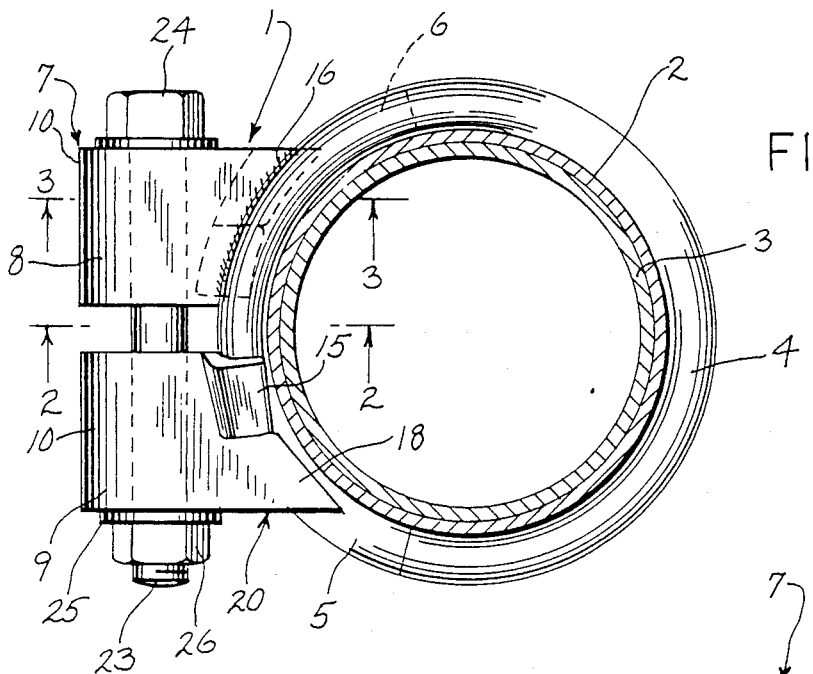
FIG. 1 is an end view of the clamp assembly as positioned around the overlapping ends of a pair of tubes.

FIG. 1 shows an improved clamp assembly 1 for joining the overlapping unslotted ends of two metal tubes 2 and 3. The clamp assembly has particular use in an exhaust system for an internal combustion engine.

Clamp assembly 1 includes a metal ring 4 having a generally circular cross section and the end portions 5 and 6 of the ring are displosed in overlapping contacting relation. The end portions 5 and 6 preferably overlap through an arc of about 70° to 90°.

A generally U-shaped bracket 7 is secured to overlapping end portion 5. Bracket 7 is generally U-shaped in cross section and includes a pair of legs 8 and 9 which are connected together by a web portion 10.

Figure 5:
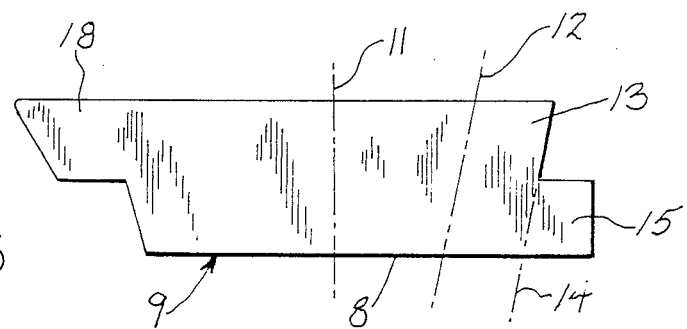
FIG. 5 is a plan view of one of the brackets in flat form.

FIG. 5 illustrates the bracket 7 in flat form before being bent into the U-shaped configuration.

The flat blank shown in FIG. 5 is bent along the transverse bend line 11 to provide the generally U-shaped configuration. The blank is then bent along the transverse bend line 12 to provide an axially extending section 13 and a further bend is made along the bend line 14, as shown in FIG. 5, to provide a radially extending extension or section 15.

Figure 2:
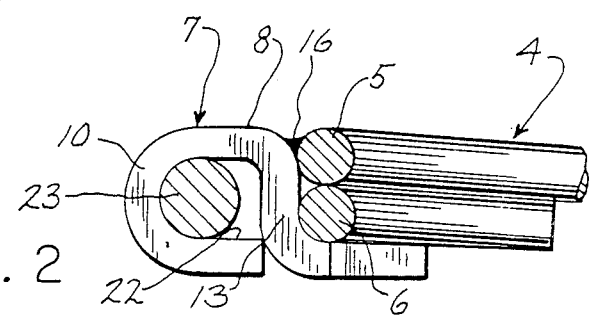
FIG. 2 is a section taken along line 2—2 of FIG. 1 with the tubes removes.
Figure 3:
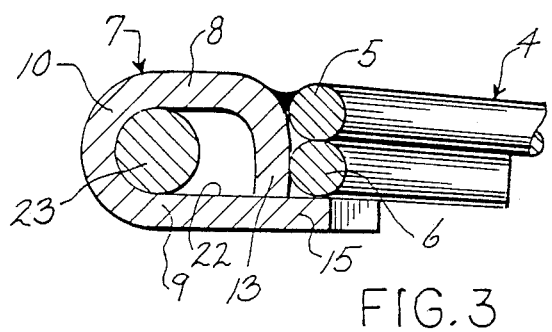
FIG. 3 is a section taken along line 3—03 of FIG. 1 with the tubes removed.

The leg 8 of the bracket 7, is secured to the end portion 5 of ring 4, as shown in FIG. 2, by weld 16. The axial section 13 is in contact with the outer periphery of end portions 5 and 6, while the projecting extension 15 extends radially of the ring and is engaged with the surface of end portion 6, as illustrated in FIG. 3.

The longitudinally extending projection or extension 18 on the opposite leg 9 is disposed in side-by-side relation with the extension 15 and also is engaged with the end portion 6 of the ring. Thus, the extensions 15 and 18 provide a guide for the end portion 6 of ring 4 as the ring is contracted in diameter and prevents the end portions 5 and 6 from separating. In addition, the axially extending section 13 also serves to guide the end portion 6 in movement and serves to prevent the end portion 6 from expanding circumferentially. Thus, the sections 15, 18 and 13 serve as guides for the end portion 6 of ring 4 as it is contracted in diameter, thus providing a more positive clamping action.

A second bracket 20, similar in construction to bracket 7, is secured to the end portion 6 and serves to guide the end portion 5 as the ring is contracted in diameter. In this regard, the section 13 of bracket 20 is welded to end portion 6 by weld 21, and in the manner previously described the sections 15, 18 and 13 serve as guides for the end portion 5, as the ring 4 is contracted in diameter.

Each of the brackets 7 and 20 is provided with an opening 22 and a fastening member, such as a bolt 23, extends through the aligned openings 22. Bolt 23 includes a head 24 which is engaged with the side edge of the bracket 7, while the opposite end of the bolt is threaded and receives a washer 25 and nut 26. Washer 25 bears against the outer side edge of bracket 20.

Figure 4:
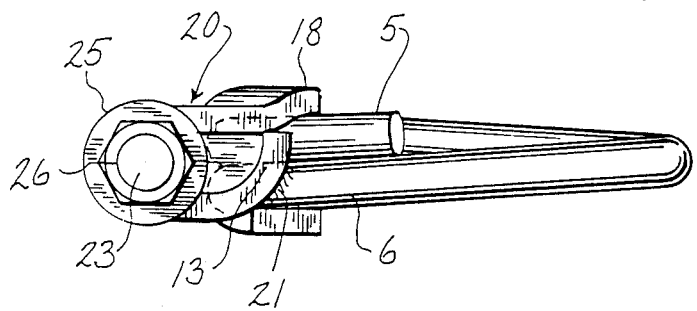
FIG. 4 is an end view of the structure shown in FIG. 1 with the tubes removed.

As shown in FIG. 4, the axis of bolt 23 lies in a plane that extends through the line of contact between the overlapping end portions 5 and 6. By threading down nut 26, ring 4 will be contracted in diameter to provide a full 360° clamping action against the tubes 2 and 3. Since the axis of the bolt 23 is aligned with the plane passing between the line of contact between end portions 5 and 6, ring 4 will be contracted circumferentially without twisting.

The invention provides an improved clamp assembly having a more positive clamping action which prevents deformation of the bracket and ring. Each bracket is welded to one of the overlapping end portions of the ring, while a portion of the welded leg, as well as the opposite leg provide guides for sliding action of the other end portion of the ring, as the ring is contracted in diameter. Various modes of carrying out the invention are contemplated as being within the scope of the following claims particularly pointing out and distinctly claiming the subject matter which is regarded as the invention.

I claim:

1. A clamp assembly for clamping overlapping ends of metal tubes, comprising a ring to receive the overlapping ends of a pair of metal tubes and having a pair of overlapping ring ends disposed in direct contact with each other, a generally U-shaped bracket for each of said ends, each bracket having opposed first and second legs, means for securing a first leg of each bracket to one of said ring ends and the second leg of each bracket being disposed in contact with the outer surface of the other of said ring ends whereby the other ring end can slide relative to the respective bracket, each bracket defining an opening with said openings being in alignment, a generally L-shaped extension connected to the first leg of each bracket and having a first section extending longitudinally of the axis of said ring and disposed in contact with the outer surface of said overlapping ring ends, said extension also having a second section extending radially inward from the outer end of said first section and disposed in contact with the outer of said first section and disposed in contact with said other ring end whereby said other ring end can slide relative to the respective extension, and fastening means extending freely through said aligned openings for drawing said brackets in a direction toward each other to contract said ring and clamp said overlapping ends of said tubes.

2. The clamp assembly of claim 1, wherein said securing means comprises a weld.

3. The clamp assembly of claim 1, wherein said fastening means comprises a bolt, said bolt including a head disposed in engagement with the side edge of one of said brackets and a nut threaded on the bolt and engaged with the side edge of the other of said brackets, whereby threading of said nut on said bolt will draw the brackets in a direction toward each other.

4. The clamp assembly of claim 1, wherein the second section of said extension is disposed in side-by-side relation with said second leg.

5. In an exhaust system, a pair of metal tubes disposed in axial alignment with adjacent end portions of said tubes being disposed in overlapping relation, and a clamp assembly comprising a ring to receive the overlapping adjacent end portions of said tubes and having a pair of overlapping ring ends disposed in direct contact with each other, a generally U-shaped bracket for each of said ring ends, each bracket having opposed first and second legs, means for securing a first leg of each bracket to one of said ring ends and the second leg of each bracket being disposed in contact with the outer surface of the other of said ring ends whereby the other ring end can slide relative to the respective bracket, each bracket defining an opening with said openings being in alignment, a generally shaped extension connected to the first leg of each bracket and having a first section extending longitudinally of the axis of said ring and disposed in contact with the outer surface of said overlapping ring ends, said extension also having a second section extending radially inward from the outer end of said first section and disposed in contact with said other ring end whereby said other ring end can slide relative to the respective extension, and fastening means extending freely through said aligned openings for drawing said brackets in a direction toward each other to contract said ring and clamp said overlapping ends of said tubes.

* * * * *